United States Patent [19]

Melzer et al.

[11] Patent Number: 5,785,907
[45] Date of Patent: Jul. 28, 1998

[54] METHOD FOR COMPENSATING SHRINKAGE OF PLASTIC WEBS

[75] Inventors: Rainer Melzer; Roland Melzer, both of Schwelm, Germany

[73] Assignee: Melzer Maschinenbau GmbH, Schwelm, Germany

[21] Appl. No.: 751,519

[22] Filed: Nov. 15, 1996

[51] Int. Cl.$^6$ .............................. B29C 43/58; B29C 59/02
[52] U.S. Cl. ...................... 264/40.1; 264/280; 264/293; 264/320
[58] Field of Search ........................ 264/320, 280, 264/284, 296, 154, 40.1, 293; 425/385

[56] References Cited

U.S. PATENT DOCUMENTS

| | | | |
|---|---|---|---|
| 3,615,149 | 10/1971 | Malone et al. | 264/295 |
| 4,064,206 | 12/1977 | Seufert | 264/295 |
| 4,183,981 | 1/1980 | Rossollin | 264/154 |
| 5,320,514 | 6/1994 | Kanome et al. | 425/385 |

FOREIGN PATENT DOCUMENTS 3612518  10/1987  Germany.

*Primary Examiner*—Jan H. Silbaugh
*Assistant Examiner*—Mark Eashoo
*Attorney, Agent, or Firm*—Townsend and Townsend and Crew LLP

[57] ABSTRACT

When producing plastic cards, a plurality of layers is laminated under application of heat and pressure resulting in unpredictable shrinking. In order to compensate shrinking, the laminated web is elongated to adapt to its nominal alignment size. Elongation is produced by material displacement along grid bars separating to-be-fabricated cards later punched off the web leaving a waste grid.

9 Claims, 2 Drawing Sheets

METHOD FOR COMPENSATING SHRINKAGE OF PLASTIC WEBS

BACKGROUND OF THE INVENTION

The present invention relates to a method for processing plastic material webs, the webs being provided with card-shaped images separated by a blank grid. Upon completion of the processing, the individual images will be punched from the web thereby producing credit cards, telephone cards, smart cards, and the like. The remaining blank grid is discarded.

Processing of such webs must meet extreme accuracy requirements. For example, when milling a recess into a card body for accommodation of a chip, the site of the recess must not deviate from predetermined coordinates relative to the card edges.

Frequently, such webs or cards are produced as multi layer laminates. In a laminating installation, the layers are hot pressed and then cooled down. A web so produced undergoes a shrinking process, that is, the dimensions of the web in longitudinal and transverse directions decrease. Even if the shrinking of, say, a few tenths of a millimeter amounts to only tenths of a percent when related to the standard card length of 86 millimeter, it nevertheless detrimentally affects the operations in following processing stations. Misalignments and/or distortions of the printed image on the cards may result from shrinking.

In a known plastic card fabrication process, positioning holes are provided in the blank grid for cooperation with positioning pins located at the various processing stations so as to present the to-be-fabricated cards in proper alignment. While the distance reduction due to shrinking may be insufficient to bring immediately succeeding holes off the capturing range of the pins, this may not hold true if the pins are allocated to each second hole or have even greater spacing.

The shrinking problem is aggravated additionally because it is not a fixed parameter but may vary depending upon the used material and may even vary when a fresh batch of one layer is processed.

SUMMARY OF THE INVENTION

It is an object of the present invention to provide a card manufacturing process wherein the detrimental effects of web shrinking are overcome. In accordance with the present invention, the web which has been subjected to shrinking is stretched in a unique manner to compensate the shrinking. It is not the entire web which is elongated but only transverse blank grid bars are subjected to cold deformation in that indentations are produced therein thereby dislodging material adjacent those indentations such that the web is elongated to adapt to its nominal alignment size. The amount of material displacement and thus the amount of elongation may advantageously be controlled by the penetration depth of pins pressed into the transverse grid bars. As the amount of shrinking is hardly predictable, preferably the actual spacing of successive holes (or other marks, e.g. printed cross-hairs) is measured and compared with the nominal spacing so as to form a servo loop (feedback control) with drive means determining the penetration depth. Optionally, the pins may produce a cold deformation or they may be heated, depending on the particular material. Indentation may be provided on only one face of the web or on both faces, and optionally, the indentations may form through holes. Depending upon the needs, each transverse grid bar or each second, third, . . . , one may be provided with the indentations of the invention.

German published patent application DE 36 12 518 A1 discloses a process wherein a plastic body is produced e.g. by means of injection molding. The body so formed is subjected to a cold deformation so that it may fit on some other member. The body is then heated and tends to assume its originally molded shape. For example, a bottle cap is produced, then widened so that it fits over a bottle mouth, and heated to shrink thereon. It will be appreciated that the problem underlying the teaching of '518 as well as the steps taught to solve it are quite different from the present invention.

DESCRIPTION OF THE SPECIFIC EMBODIMENT

Embodiments of the invention are illustrated in the attached drawings and will now be explained with reference thereto.

Figure 1:
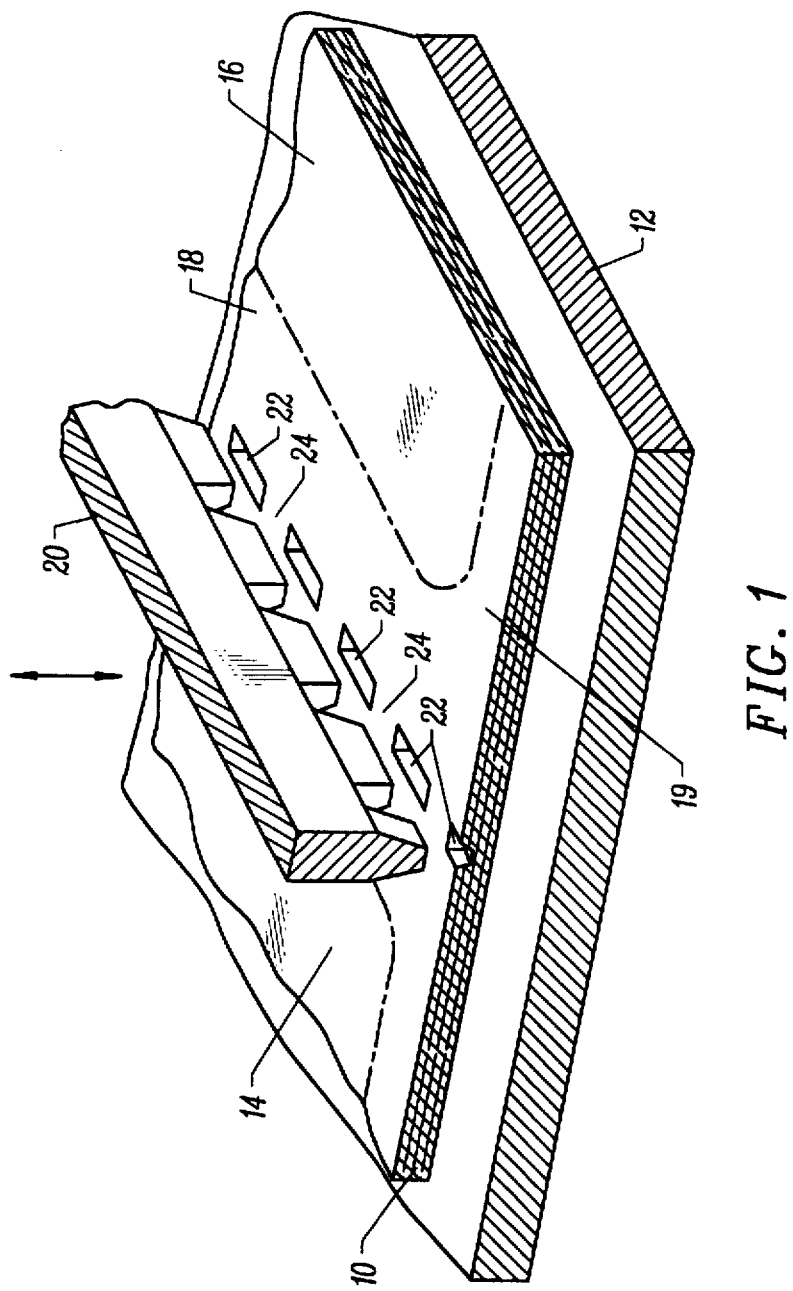
FIG. 1 is an isometric view, partly broken away, of a plastic material tape after being stretched in accordance with the teaching of the invention.

FIG. 1 shows a portion of a plastic material tape or web 10 placed on a plane support 12. Two to-be-fabricated cards 14 and 16 are indicated by their contours although they will be punched from the web at a later stage. Between adjacent cards there is a blank grid comprising transverse bars 18 and longitudinal bars 19. Indentations 22 separated by spacers 24 have been pressed into transverse bar 18 by means of a tool 20 which is reciprocable orthogonally to the plane of support 12 as indicated by the arrow. The tool 20 comprises a plurality of transversely spaced apart indentation tips, usually being tapered in the downward direction. Thus, a plurality of spaced indentations 22 are provided between the "cards" 14, 16. Preferably, indentations 22 and spacers 24 are provided along rows and/or columns. It is preferred that the indentations taper in penetration direction as may be seen at the sectioned indentation. Thus, the penetration depth determines the amount by which the portions of the web containing the to-be-fabricated cards are spread apart. The illustrated tool shape and resulting shape of indentations is only one of a greta variety of possible shapes. For example, the indentations could be cone shaped or frusto-conical.

In another embodiment, not illustrated, indentations may be produced from both faces of the web, and the indentations of one and the same row may alternatingly be produced on the front face and the back face.

Formation of the indentations 22 physically displaces material in a longitudinal direction so that the web as a whole is elongated. It is preferred to use cold deformation but, optionally, tool 20 could be heated. When cold deformation is applied, care must be taken not to exceed the breaking load which for particular materials, such as polyvinylchloride (PVC), is quite close to the deformation load. Therefore, the individual indentations are separated by spacers 24. In other materials, these indentations comprise a continuous groove extending along most or the entire length of the blank grid bar 18.

Figure 2:
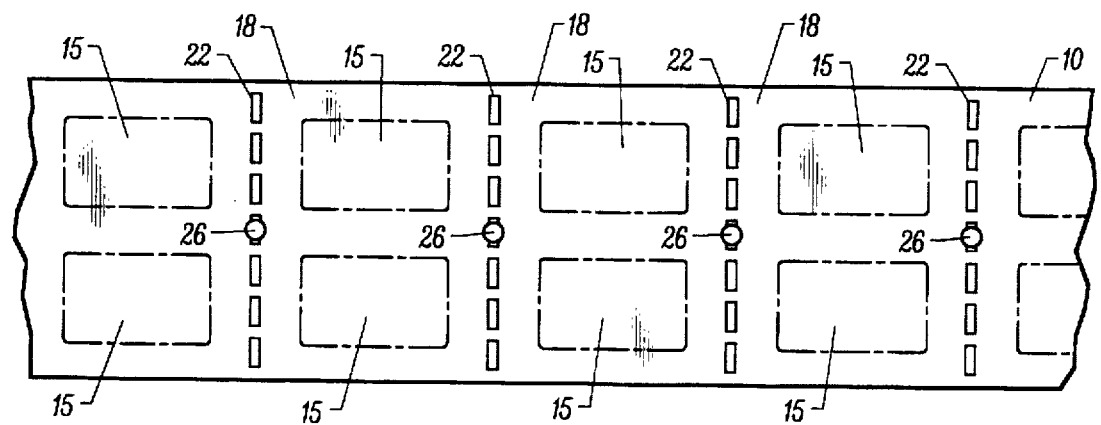
FIG. 2 is a schematic plan view of a portion of a stretched plastic web.

FIG. 2 illustrates a somewhat longer portion of web 10. A plurality of to-be-fabricated cards 15 are arranged in successive pairs. The web 10 is provided with positioning holes 26. In a preferred embodiment, the actual distance separating adjacent holes 26 is measured and compared with a nominal distance, and the penetration depth of tool 20 is controlled to minimize the difference between actual and nominal distances.

Figure 3:
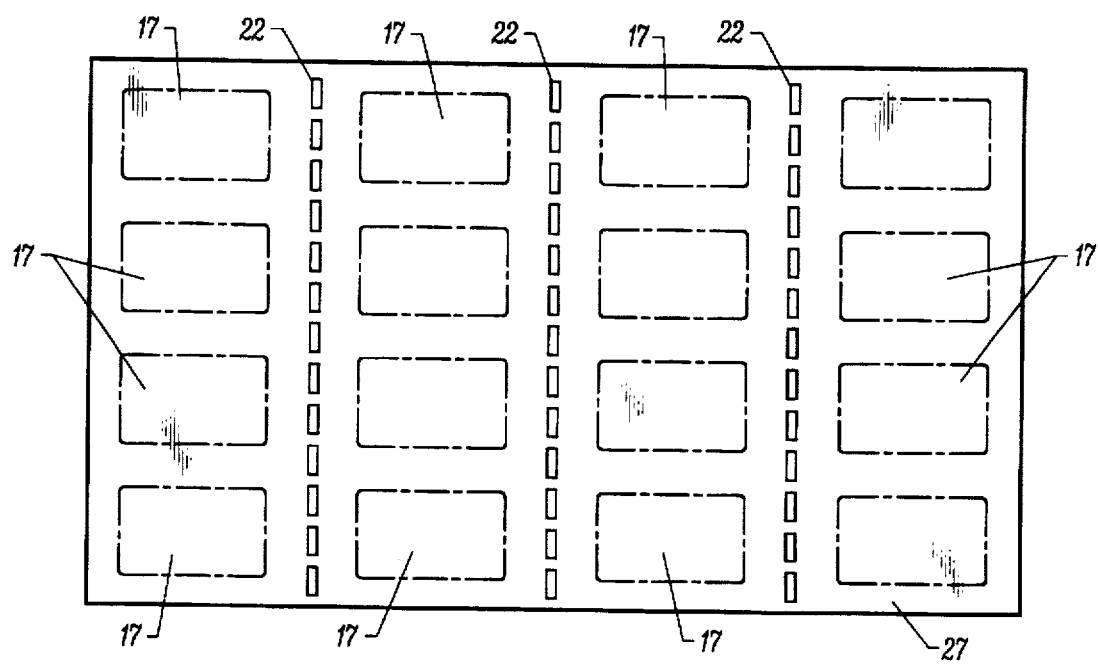
FIG. 3 is a similar plan view of a stretched sheet.

The invention is not limited to elongation of tape-like webs. As illustrated in FIG. 3, sheets 27 having rows and columns of to-be-fabricated cards 17, may be elongated in at least one direction, as indicated by the indentations 22. In a particular fabrication process, such sheets are cut to form strips similar to the web shown in FIG. 2, the strips are chained to form such a web, and positioning holes are punches through. The processing will then proceed as set forth above.

While the above is a complete description of the preferred embodiments of the invention, various alternatives, modifications, and equivalents may be used. Therefore, the above description should not be taken as limiting the scope of the invention which is defined by the appended claims.

What is claimed is:

1. A method for processing a plastic material web provided with card-shaped images which are separated by a blank grid, said material having undergone a shrinking process to produce a shrunk material, comprising elongating said shrunk material by producing indentations in said blank grid whereby material thereof is displaced in a direction of elongation and said card-shaped images to compensate for said shrinking process.

2. The method of claim 1 wherein a predetermined number of adjacent indentations is produced along a grid bar.

3. The method of claim 1 wherein said indentations are produced by cold plastic deformation.

4. The method of claim 3 wherein separate indentations are produced along a grid bar.

5. The method of claim 1 wherein indentation tips are pressed into said blank grid.

6. The method of claim 5 wherein an amount of elongation is determined by a tip penetration depth.

7. The method of claim 1 wherein said web is tape-shaped.

8. The method of claim 7 wherein said web is provided with nominally equidistant index marks and wherein an amount of elongation is automatically controlled in response to an actually measured index mark spacing.

9. The method of claim 8 wherein said index marks are holes punched through said web.

* * * * *

UNITED STATES PATENT AND TRADEMARK OFFICE
CERTIFICATE OF CORRECTION

PATENT NO. : 5,785,907
DATED : July 28, 1998
INVENTOR(S) : Rainer Melzer, et. al.

It is certified that error appears in the above-indentified patent and that said Letters Patent is hereby corrected as shown below:

Title page, item [30] Foreign Application Prioriy Data should read --

November 18, 1995 [DE] Germany 195 43 139.1 --

Signed and Sealed this

Nineteenth Day of October, 1999

Attest:

Q. TODD DICKINSON

Attesting Officer     Acting Commissioner of Patents and Trademarks